United States Patent [19]

Neron et al.

[11] Patent Number: 5,657,962

[45] Date of Patent: Aug. 19, 1997

[54] SOLENOID VALVE CLOSURE PART AND RECYCLING CIRCUIT FOR THE PETROL VAPOURS OF INTERNAL COMBUSTION ENGINES

[75] Inventors: Gilles Neron, Le Gendre; José Vaz De Azevedo, Issoire, both of France

[73] Assignee: Sagem SA, France

[21] Appl. No.: 559,909

[22] Filed: Nov. 17, 1995

[30] Foreign Application Priority Data

Nov. 17, 1994 [FR] France ................... 94 13758

[51] Int. Cl.$^6$ ................................ F16K 31/02
[52] U.S. Cl. ............... 251/129.15; 137/630; 123/520
[58] Field of Search ............... 13/520, 521, 518, 13/519, 516, 198 D; 137/907, 628, 630; 251/129.15

[56] References Cited

U.S. PATENT DOCUMENTS

| | | | |
|---|---|---|---|
| 2,866,477 | 12/1958 | Bredtschneider | 137/628 |
| 2,983,286 | 5/1961 | Greenawalt | 137/628 |
| 4,515,066 | 5/1985 | Ito | 137/907 |
| 4,759,255 | 7/1988 | Shimamura | 137/630 |
| 4,844,559 | 7/1989 | Harrison | 251/129.15 |
| 4,896,699 | 1/1990 | Shimamura | 137/630 |
| 4,944,276 | 7/1990 | House et al. | |
| 5,174,262 | 12/1992 | Staerzl | 123/458 |
| 5,238,222 | 8/1993 | Sumida | 251/129.15 |
| 5,341,787 | 8/1994 | Zabeck | 123/520 |
| 5,509,395 | 4/1996 | Cook | 123/518 |
| 5,524,593 | 6/1996 | Denne | 123/458 |

FOREIGN PATENT DOCUMENTS

| | | | |
|---|---|---|---|
| 5395 | 4/1979 | European Pat. Off. | |
| 243755 | 4/1980 | France | |
| 9380 | 1/1982 | Japan | 137/628 |
| 9208918 | 5/1992 | WIPO | |

Primary Examiner—Carl S. Miller
Attorney, Agent, or Firm—Graham & James LLP

[57] ABSTRACT

A solenoid valve closure part comprising a seat and a solenoid coil, the valve closure part including the free end of a movable core within the hub of the coil, and further including an intermediate component capable of bearing against the seat and itself comprising a second seat, facing the first seat and of a lesser cross section than that of the first seat, the free end of the movable core being capable of bearing against the second seat and an elastic element being provided to press the intermediate component away from the first seat.

5 Claims, 2 Drawing Sheets

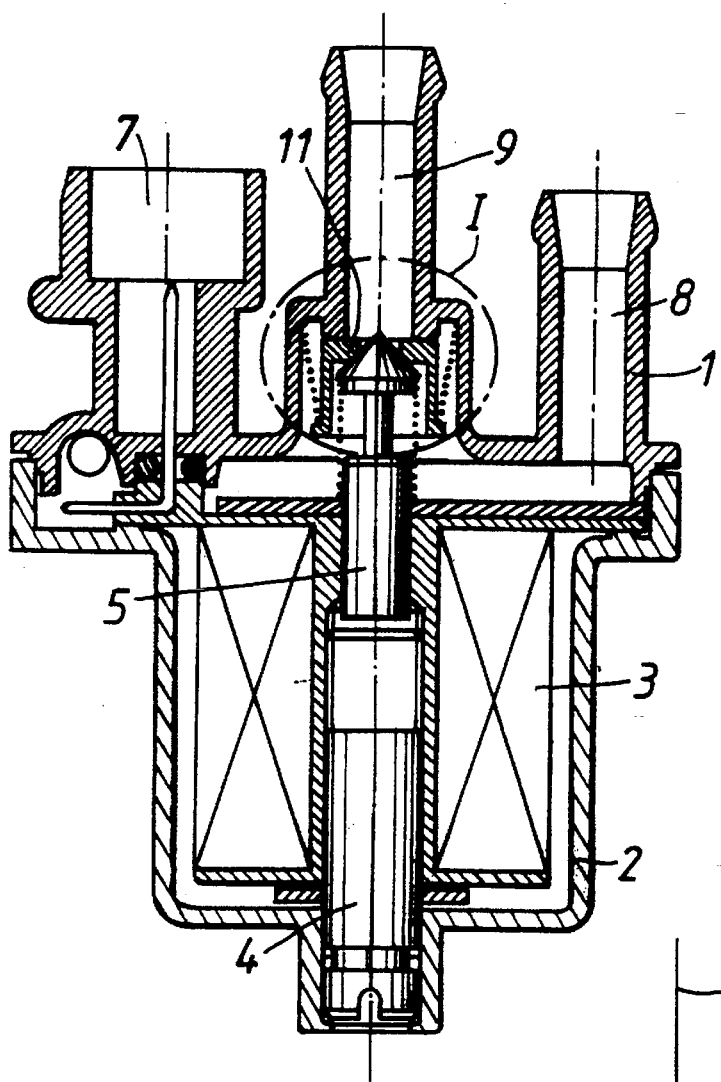
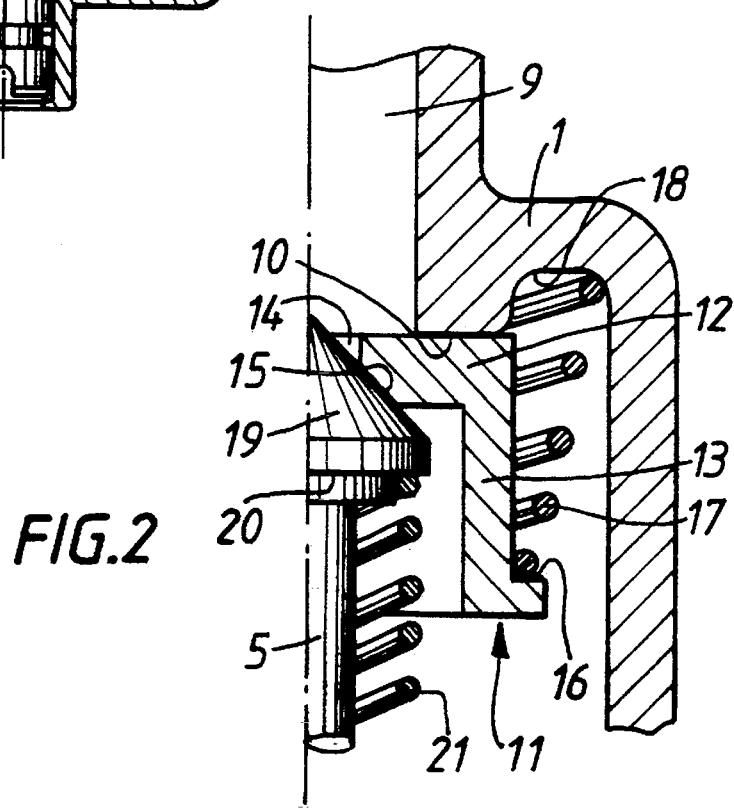

SOLENOID VALVE CLOSURE PART AND RECYCLING CIRCUIT FOR THE PETROL VAPOURS OF INTERNAL COMBUSTION ENGINES

The present invention relates to a closure part for a solenoid valve and a recycling circuit for the petrol vapours of internal combustion engines. More particularly it relates to a closure part of a solenoid valve comprising a seat and a solenoid coil, the said closure part including the free end of a movable core within the hub of the said coil.

In closure parts of this type the solenoid coil is generally supplied with intermittent current of a constant phase and of a variable cyclic ratio, the cyclic ratio being defined as the ratio of the duration in which, over a phase, the voltage is at a high level, compared with the duration of the phase. The free end of the movable core forms a closure part of which the position varies according to the negative pressure downstream of the solenoid valve and the cyclic opening ratio between a closed position where this free end is bearing against the seat and consequently closes the solenoid valve, and the most distant position from the seat where the output is maximum. Of course, the output is dependent on both the separation between the closure part and the seat and the negative pressure prevailing between the inside and outside of the solenoid valve.

One problem which arises is that of output at very slight negative pressures. Indeed, in known solenoid valves the output in the case of slight negative pressure is itself very slight, unstable and non-reproducible. However, high outputs are sometimes desired though the negative pressure is slight.

This is the case in particular in recycling circuits for the petrol vapours in internal combustion engines. Such circuits are intended to recycle, at the input of the engine, the petrol vapours contained in the tank. The negative pressure is in this case provided by the supply of the engine. It is thus low with a low load so that the recycling is ineffective.

The present invention aims to overcome these disadvantages. More precisely the invention aims to provide a closure part for a solenoid valve which has a high output even in the case of slight differences in pressure and which, in the case of greater differences in pressure, has a lower output and an output/pressure characteristic of a standard solenoid valve.

To this end the invention firstly has the object of providing a solenoid valve closure part comprising a seat and a solenoid coil, the said closure part including the free end of a movable core within the hub of the said coil, characterised in that it also includes an intermediate component capable of bearing against the said seat and itself comprising a second seat facing the first seat and of a lesser cross section than that of the first seat, the said free end of the movable core being capable of bearing against the said second seat and elastic means being provided to press the said intermediate component away from the said first seat.

It will become clear later that such an arrangement permits, while the negative pressure downstream of the closure part is slight, opening of the first seat and thus a large output, then, when the negative pressure increases, closure of the first seat to the benefit of the second and thus a lower output and a standard operating characteristic.

In a particular embodiment of the invention the said intermediate component is cup-shaped, the said second seat being formed in the base of the said cup, the said base, with its outer side, facing the said first seat, and the said free end of the core being engaged in the said cup.

Also in a particular embodiment the said elastic means comprise a coil spring bearing at one end against a bearing surface of the casing, and at its other end on a shoulder of the said intermediate component.

The said free end of the movable core and the said second seat may be conical.

Second elastic means may also be arranged to press the said movable core towards the said second seat.

It is also the aim of the present invention to provide a recycling circuit for petrol vapours of an internal combustion engine, characterised in that it includes a solenoid valve with a valve closure part as described above.

One particular embodiment of the invention will now be described by way of non-limiting example with reference to the attached schematic drawings in which:

FIG. 1 is an axial cross sectional view through a solenoid valve comprising a closure part in accordance with the invention;

FIG. 2 is a half-view on a larger scale of the detail I in FIG. 1;

Figure 4:
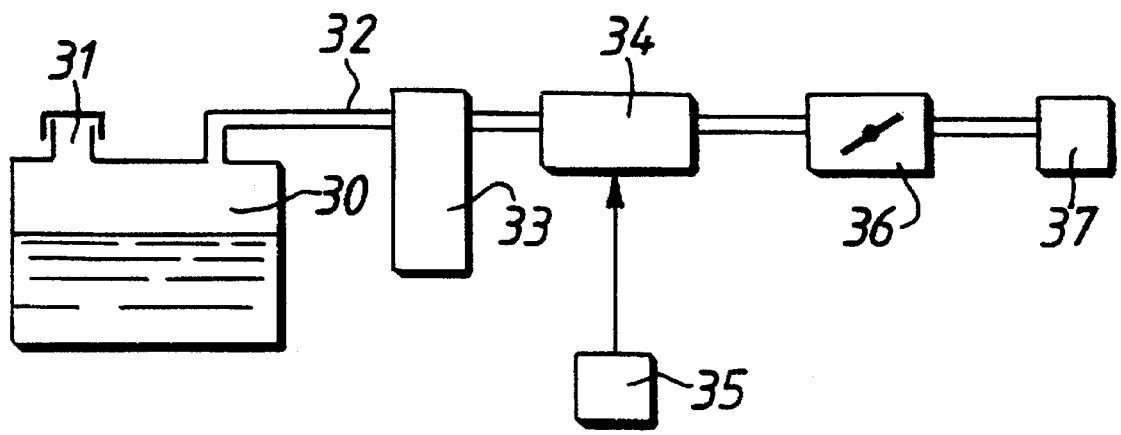

FIG. 4 schematically illustrates a recycling circuit for petrol vapours comprising the closure part of FIG. 1.

The solenoid valve of FIGS. 1 and 2 includes a body 1 and a cover 2 delimiting a space in which a solenoid coil 3 is housed. Inside the hub of the coil is disposed a fixed magnetic core 4 and a movable core 5 axially spaced by a variable length defining the gap of the coil. The smaller the gap, the stronger the force of attraction of the movable core 5 by the fixed core 4 for a given cyclic ratio of the supply of the coil.

The coil 3 is supplied with intermittent current with a variable cyclic ratio from a connector 7 formed in the casing 1.

The casing 1 also forms an inlet duct 8 and an outlet duct 9 for fluid for the inner space of the casing. The inner end of the duct 9 defines a first seat 10 with which an intermediate component 11 cooperates.

This component 11 is cup-shaped with a base 12 and a substantially cylindrical lateral wall 13. The bottom face 12 on the outside of the cup faces the seat 10. The base 12 also comprises an aperture 14 of which the part located on the inside of the cup is bevelled in such a way as to form a second seat 15 which is conical, coaxial to the first seat and of which the opening cross section is smaller than that of the first seat 10.

A shoulder 16 of the wall 13 receives one end of a coil spring (in this case of a truncated cone shape) 17 of which the other end is supported in a groove 18 formed in the casing 1. The spring 17 thus pushes back the component 10 away from the seat 11.

The movable core 5 is formed of a cylindrical rod of which one end is engaged in the hub of the coil and of which the other end is in the form of a cone 19 and is engaged inside the component 13 in order to cooperate with the seat 15 thereof. A shoulder 20 receives one end of another spring 21 of which the other end bears against the casing in such a way as to tend to press the conical end of the core 5 onto the second seat 15.

The solenoid valve just described operates in the following manner.

At rest, the closure part is closed as illustrated in the drawings, the force exerted by the spring 21 being greater than that of the spring 17.

When the rod 5 is acted upon by the solenoid valve and the negative pressure is slight, the cone 19 tends to move away from the seat 15, compressing the spring 21. However, because the negative pressure is not great, the spring 17 pushes back the component 11 away from the seat 10, the seat 15 remaining closed.

Figure 3:
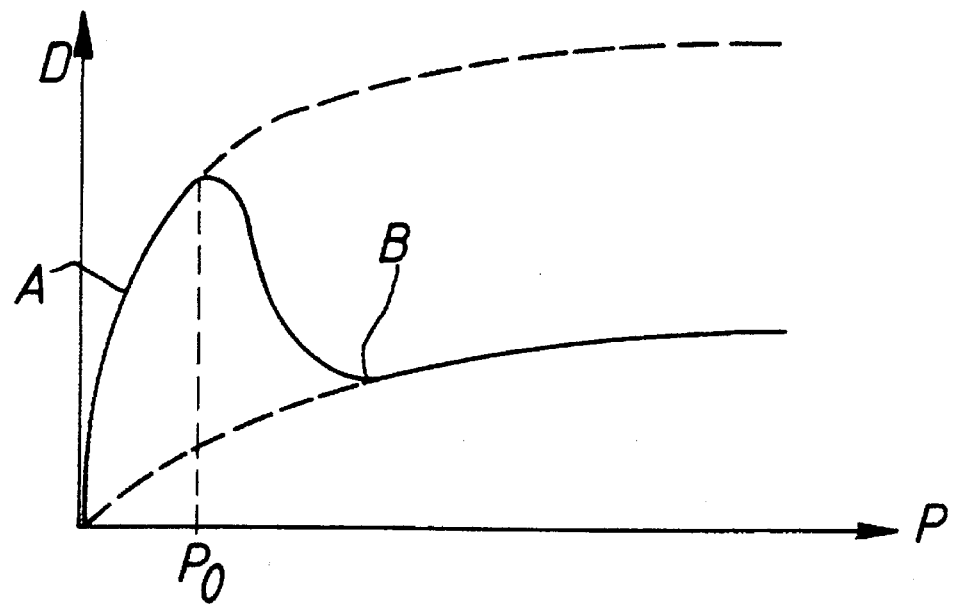
FIG. 3 illustrates the operating characteristic of the valve of FIG. 1.

The seat 10 is thus open, permitting a strong output. This condition is that of part A of the curve of FIG. 3 where the output increases very rapidly with the negative pressure.

The negative pressure increases and reaches the value $P_o$, the component 11 is "sucked" towards the seat 10 and closes this seat while opening the seat 15, which is of a smaller cross section. The operating point of the valve is thus moved in part B of the curve of FIG. 3.

FIG. 4 shows a tank 30 of petrol for an internal combustion engine and in particular for a motor vehicle engine. The tank 30 has a filling aperture 31 and another aperture from which issues piping 32 of which the other end is connected to a petrol vapour trap 33 with activated carbon. The output of the trap 33 is connected to the input of a solenoid valve 34 of the type just described. This solenoid valve 34 is controlled by a computer 35.

The output of the solenoid valve 34 is connected to the input of a butterfly valve 36 at which the air and petrol arrive and of which the output is connected in a known manner to the bank 37 to supply the injection nozzles of the engine.

Depending on the speed of rotation of the engine the computer 35 controls the cyclic ratio of the intermittent current supplying the coil 7 and thus controls the output of petrol vapours in the solenoid valve 34. This solenoid valve is closed at rest, ie when the engine is at rest. It opens progressively by increasing the cyclic ratio insofar as the computer makes the request therefor.

With the aid of the closure part of the invention the recycling of petrol vapours is suitably carried out, including under strenuous operating conditions, when the negative pressure of the engine is slight, while retaining a good degree of precision for the output in less strenuous operating conditions.

We claim:

1. A solenoid valve for connecting a relatively high pressure upstream area with a relatively low pressure downstream area, for controlling a flow of fluid from the upstream area to the downstream area, the solenoid valve comprising:

i) a casing having an inlet adapted to be connected to the upstream area and an outlet adapted to be connected to the downstream area;

ii) a first seat formed at an inner end of the outlet;

iii) an intermediate component, having a base part, with a side of the base part facing the first seat, whereby the outlet is closed or opened depending on the relative adjacent position of the first seat and the intermediate component, and wherein another side of the base part forms a second seat around an aperture, coaxial to the first seat, and having a cross section smaller than that of the first seat;

iv) a control coil positioned such that when the coil is energized, the first seat is opened and the second seat is closed if the pressure differential between the upstream and outstream areas is relatively low, wherein the first seat is closed and the second seat is open if the pressure differential is relatively high, and wherein both seats are closed when the coil is not energized;

v) a core movable within the hub of the coil, the position of which is controlled by the coil, the core having an outer end facing the second seat to close or open the second seat depending on the relative position of the core and the intermediate component; and vi) first elastic means biasing the intermediate component away from the first seat and second elastic means biasing the core towards the second seat.

2. A solenoid valve closure part as claimed in claim 1, wherein the said intermediate component is cup-shaped, the said second seat being formed in the bottom of the said cup, the said bottom, on its outer side, facing the said first seat, and the said free end of the core being engaged into the said cup.

3. A solenoid valve closure part as claimed in claim 1, wherein the said elastic means include a coil spring, bearing at one end against a supporting surface of the casing, and at its other end on a shoulder of the said intermediate component.

4. A solenoid valve closure part as claimed in claim 1, wherein the said free end of the movable core and the said second seat are conical.

5. A recycling circuit for the recycling of petrol vapours of internal combustion engines having valve means, characterized in that the valve means for said recycling circuit comprises the solenoid valve of claim 1.

* * * * *